United States Patent [19]

Brynestad et al.

[11] 4,452,767

[45] Jun. 5, 1984

[54] METHOD FOR REMOVING OXIDE CONTAMINATION FROM TITANIUM DIBORIDE POWDER

[75] Inventors: Jorulf Brynestad; Carlos E. Bamberger, both of Oak Ridge, Tenn.

[73] Assignee: The United States of America as represented by the United States Department of Energy, Washington, D.C.

[21] Appl. No.: 488,802

[22] Filed: Apr. 26, 1983

[51] Int. Cl.³ .............................................. C01B 35/04
[52] U.S. Cl. ...................................... 423/297; 423/76; 423/277; 423/472; 423/492; 423/659; 501/97
[58] Field of Search ............... 423/297, 277, 341, 492, 423/495, 76, 472; 501/97

[56] References Cited

U.S. PATENT DOCUMENTS 3,853,541 12/1974 Othmer ................................... 423/76
4,288,411 9/1981 Holland et al. ...................... 423/492

OTHER PUBLICATIONS

Othmer, D. F. et al., "Metal Ordering by Chlorine Affinities for Oxides", Metallurgical Society of AIME Light Metals Committee Proceedings of the Sessions, vol. 1, 1973, pp. 271–298.
*The Condensed Chemical Dictionary*, Nineth Edition, Van Nostrand Reinhold Company, New York, 1977, p. 865.

*Primary Examiner*—John Doll
*Assistant Examiner*—Jackson Leeds
*Attorney, Agent, or Firm*—Edwin D. Grant; Stephen D. Hamel; Michael F. Esposito

[57] ABSTRACT

A method for removing oxide contamination from titanium diboride powder involves the direct chemical treatment of $TiB_2$ powders with a gaseous boron halide, such as $BCl_3$, at temperatures in the range of 500°–800° C. The $BCl_3$ reacts with the oxides to form volatile species which are removed by the $BCl_3$ exit stream.

2 Claims, No Drawings

METHOD FOR REMOVING OXIDE CONTAMINATION FROM TITANIUM DIBORIDE POWDER

BACKGROUND OF THE INVENTION

This invention, which was made under a contract with the U.S. Department of Energy, relates to titanium diboride powder and, more particularly, to a method for purifying such powder.

Titanium diboride ($TiB_2$), an extremely hard refractory solid with very high resistance to oxidation and very low electrical resistance, is commonly commercially produced by the carbothermic reduction of a mixture of the oxides of titanium and boron. The $TiB_2$ product from this process is always contaminated with oxides. Another method for producing $TiB_2$ involves chemical vapor deposition from a mixture of titanium tetrachloride ($TiCl_4$), boron trichloride ($BCl_3$), and hydrogen ($H_2$) on a hot surface. This method produces macrosize crystals of pure $TiB_2$ which must be mechanically ground into powder and which consequently become contaminated, usually with metal oxides ($Al_2O_3$, $SiO_2$) from the grinding apparatus. It is suspected that this oxide contamination has a deleterious effect on the sintering of the powders and furthermore on integrity of sintered products.

Modifications to existing processes that would result in the direct production of pure $TiB_2$ powders could be costly. It is therefore desirable to have a method for removing oxide contamination from $TiB_2$ powders produced by existing processes.

SUMMARY OF THE INVENTION

It is the object of this invention to provide a method whereby oxide contamination can be removed from $TiB_2$ powders. This is accomplished by chemically treating $TiB_2$ powders with a gaseous boron halide such as boron trichloride ($BCl_3$) at temperatures in the range of 500°–800° C. The $BCl_3$ reacts with the contained oxides to form volatile species which are removed by the $BCl_3$ exit stream. Typical reactions, depending on which oxides are present, are represented by the following equations:

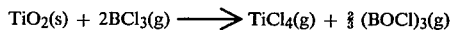

$$TiO_2(s) + 2BCl_3(g) \longrightarrow TiCl_4(g) + \tfrac{2}{3}(BOCl)_3(g)$$

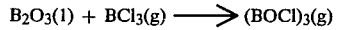

$$B_2O_3(l) + BCl_3(g) \longrightarrow (BOCl)_3(g)$$

$$5Ti_2O_3(s) + 17BCl_3(g) \longrightarrow 9TiCl_4(g) + 5(BOCl)_3(g) + TiB_2(s)$$

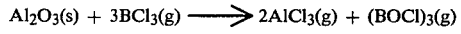

$$Al_2O_3(s) + 3BCl_3(g) \longrightarrow 2AlCl_3(g) + (BOCl)_3(g)$$

$$3SiO_2(s) + 6BCl_3(g) \longrightarrow 3SiCl_4(g) + 2(BOCl)_3(g)$$

Equilibrium constants for the above equations show favorable values at 1000K indicating that all of the reactions are spontaneously effective. Thus, the oxide-contaminated $TiB_2$ obtained from the aforementioned commercial processes can readily be purified by treating the product with $BCl_3$ in accordance with the method of the invention.

DETAILED DESCRIPTION OF PREFERRED EMBODIMENTS OF THE INVENTION

A number of 1.25 g samples of commercially available $TiB_2$ were treated with $BCl_3$ at temperatures in the range of 500° C. to 850° C. Each sample was analyzed for oxygen content and placed in a gold combustion boat. The boat was inserted into a nickel tube which had been passivated by a pretreatment with $BCl_3$. A flow of $BCl_3$ (40 ml/min.) was directed through the tube as the tube and sample were heated to the desired temperature by a tube furnace. Each sample was treated for two hours and then cooled to room temperature in an argon atmosphere. The system was then transferred to a glove box with an inert atmosphere for weighing and sampling the $TiB_2$. Oxide content of the samples was based on the oxygen content as determined by neutron activation analysis (NAA). Results are shown in Table I below.

TABLE I

| % Oxygen (by NAA) | | Temperature |
|---|---|---|
| As received | After $BCl_3$ Treatment | °C. |
| 4.1 | 0.68 | 850 |
| 0.75 | 0.57 | 850 |
| 4.1 | 1.5 | 500 |
| 4.2 | 1.5 | 600 |
| 4.2 | 1.3 | 700 |

EXAMPLE II

A second group of samples of $TiB_2$ of the same size and origin used in Example I was exposed to $BCl_3$ at temperatures ranging from 600° C. to 800° C. Each sample was placed in a previously $BCl_3$-passivated vertical nickel tube equipped with a nickel frit at its bottom end to retain the $TiB_2$ and allow passage of $BCl_3$. As the system was heated under argon to a desired temperature, a flow of $BCl_3$ (40 ml/min.) was directed upward into the bottom of the tube and through the nickel frit. The particles of $TiB_2$ were dispersed and suspended in the flowing $BCl_3$, providing an improved solid-to-gas contact. Each sample was treated at a specific temperature for four hours and then processed according to the cooling, weighing, sampling, and analyzing procedure of Example I. Results are shown in Table II.

TABLE II

| % Oxygen (by NAA) | | Temperature |
|---|---|---|
| As received | After $BCl_3$ Treatment | °C. |
| 4.2 | 1.7 | 700 |
| 4.2 | 1.3 | 600 |
| 0.58 | 0.37 | 650 |
| 1.7 | 0.3 | 650 |
| 2.2 | 0.8 | 650 |
| 2.0 | 0.8 | 650 |
| 0.8 | 0.64 | 800 |
| 2.7 | 0.63 | 700 |

What is claimed is:

1. A method for purifying titanium diboride powder contaminated with an oxide selected from the group consisting of $TiO_2$, $Ti_2O_3$, $Al_2O_3$, $SiO_2$, and $B_2O_3$, comprising:
   contacting the contaminated titanium diboride powder with an excess amount of gaseous $BCl_3$ to thereby form gaseous $(BOCl)_3$ by reaction of said $BCl_3$ with said oxide; and
   separating the gaseous $(BOCl)_3$ from the titanium diboride powder.

2. The method of claim 1 wherein said gaseous $BCl_3$ is contacted with said contaminated titanium diboride powder at a temperature in the range of about 500° C. to about 850° C.

* * * * *